United States Patent [19]

Dano et al.

[11] 4,398,198
[45] Aug. 9, 1983

[54] PULSE-HYPERBOLIC LOCATION SYSTEM USING THREE PASSIVE BEACON MEASUREMENTS

[75] Inventors: Paul K. Dano, Euless; Eric C. Ko, Carrollton

[73] Assignee: Del Norte Technology, Inc., Euless, Tex.

[21] Appl. No.: 201,506

[22] Filed: Oct. 28, 1980

[51] Int. Cl.³ .............................................. G01S 1/24
[52] U.S. Cl. .................................. 343/103; 343/112 D
[58] Field of Search ............... 343/103, 105 R, 112 R, 343/112 D

[56] References Cited

U.S. PATENT DOCUMENTS

| | | | |
|---|---|---|---|
| 2,837,738 | 6/1958 | Van Valkenburgh | 343/112 R |
| 2,971,190 | 2/1961 | Busignies | 343/112 R |
| 3,212,091 | 10/1965 | Bissett et al. | 343/112 R |
| 3,328,565 | 6/1967 | Prichodjko | 343/103 X |
| 3,705,403 | 12/1972 | Hughes | 343/105 R |
| 3,928,852 | 12/1975 | Barker | 343/105 R |
| 4,229,737 | 10/1980 | Heldwein et al. | 343/112 D X |

*Primary Examiner*—T. H. Tubbesing
*Attorney, Agent, or Firm*—Louis Bernat

[57] ABSTRACT

A radar system is used to locate a vehicle's position on a predetermined X, Y grid, which could be latitude and longitude. Several paths of different lengths link the vehicle with a master station which transmits cyclically recurring pulses. Equipment on the vehicle compares the propagation time required for the pulses to travel over each of the several paths. The compared times are then used by a microprocessor to calculate the position of the vehicle. The several paths are identified by a use of repeater stations which may selectively drop predetermined ones of the cyclically recurring pulses and retransmit the rest. For example, one repeater may retransmit every second recurring pulse and another repeater may retransmit every third recurring pulse.

22 Claims, 26 Drawing Figures

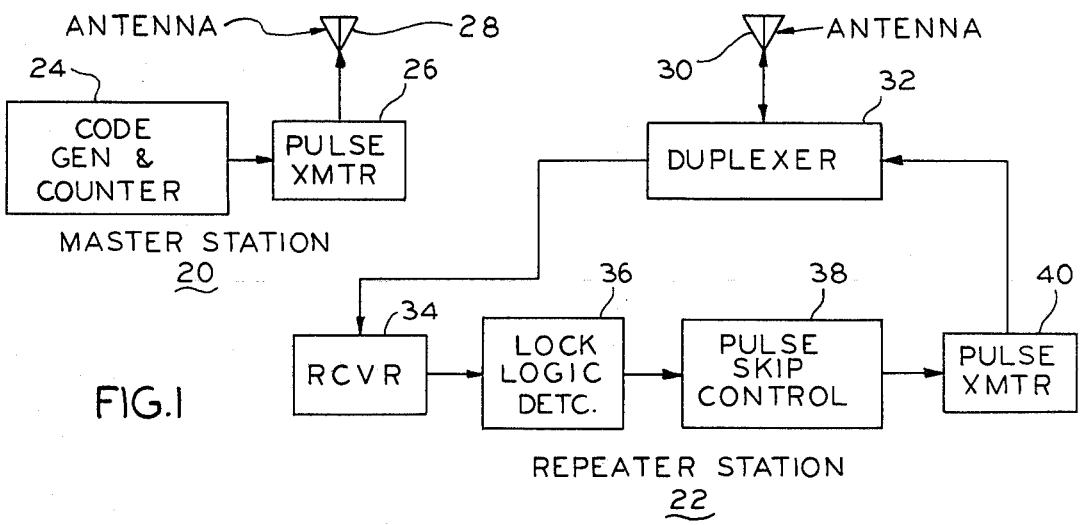
FIG.1
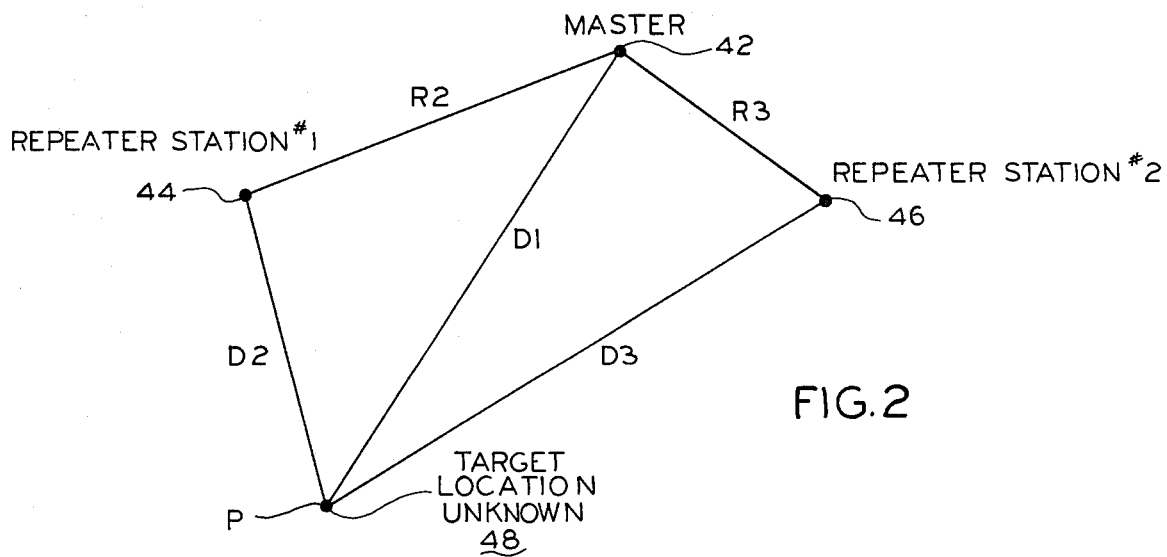
FIG.2
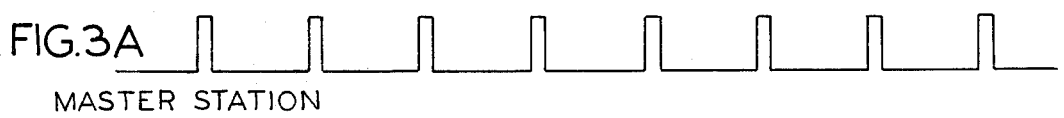
FIG.3A  MASTER STATION
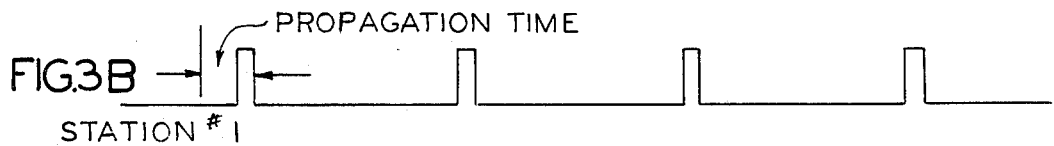
FIG.3B  STATION #1
PROPAGATION TIME
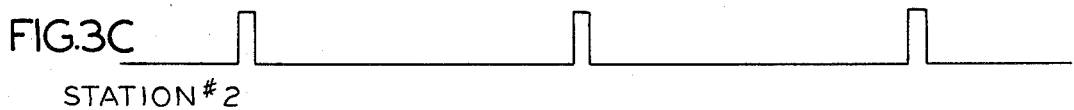
FIG.3C  STATION #2

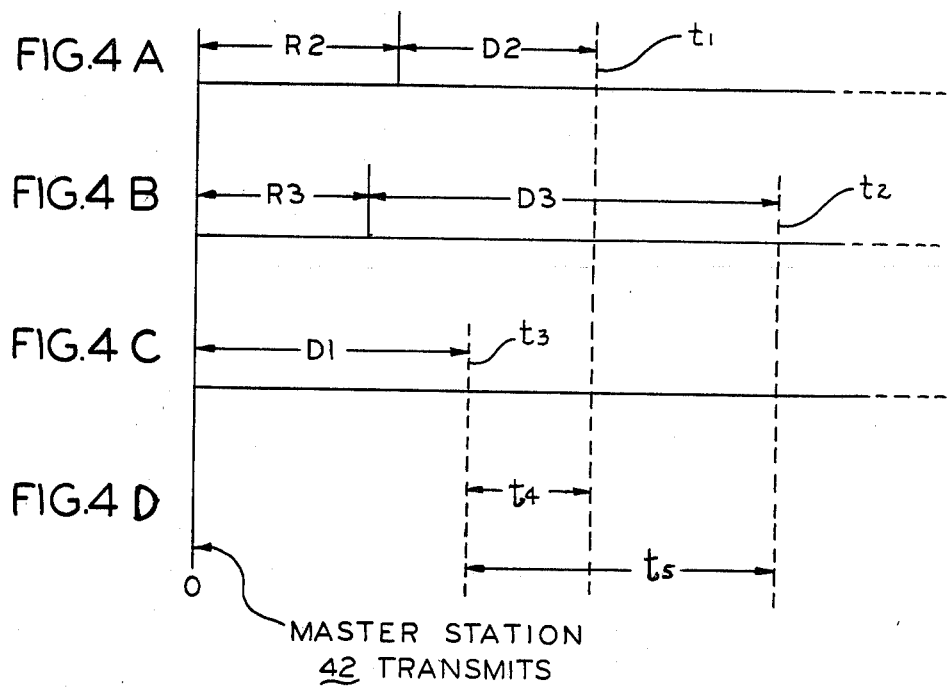
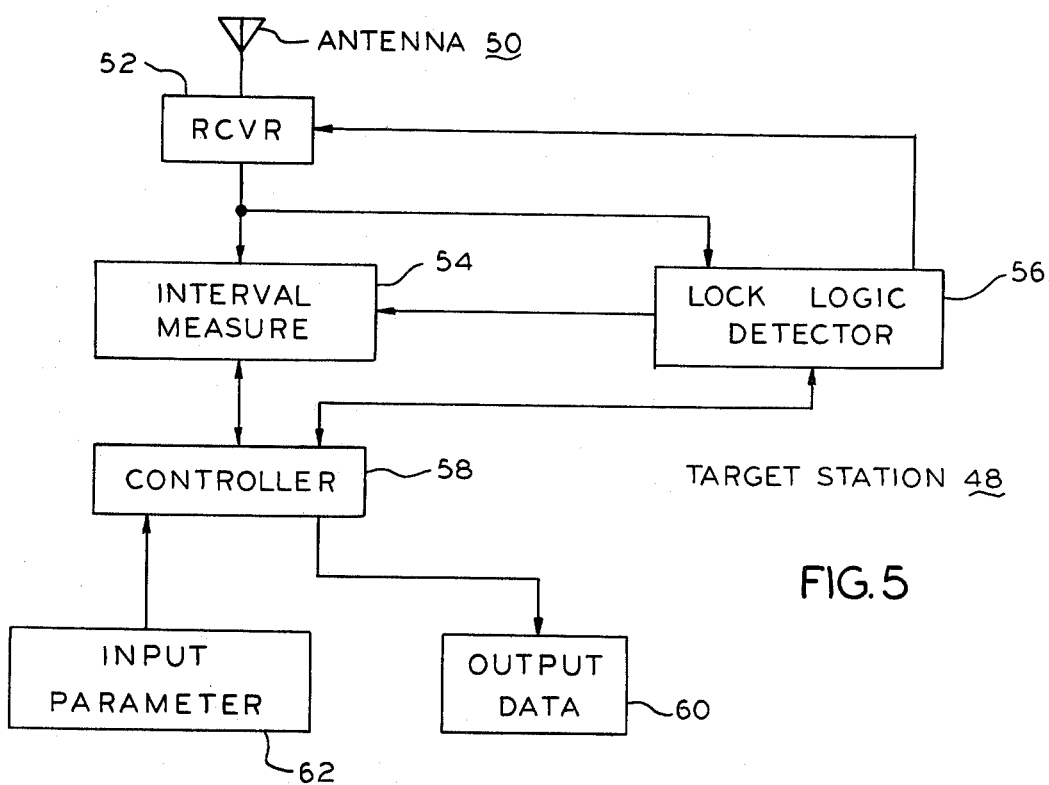
FIG. 5

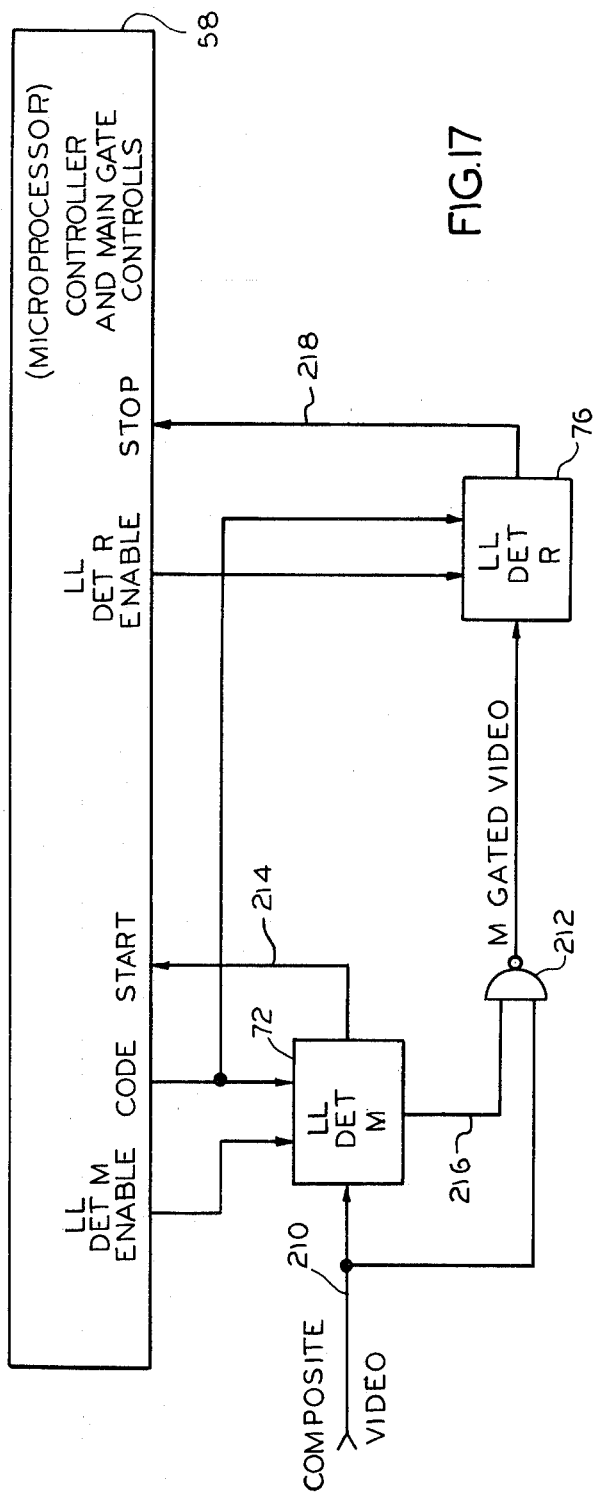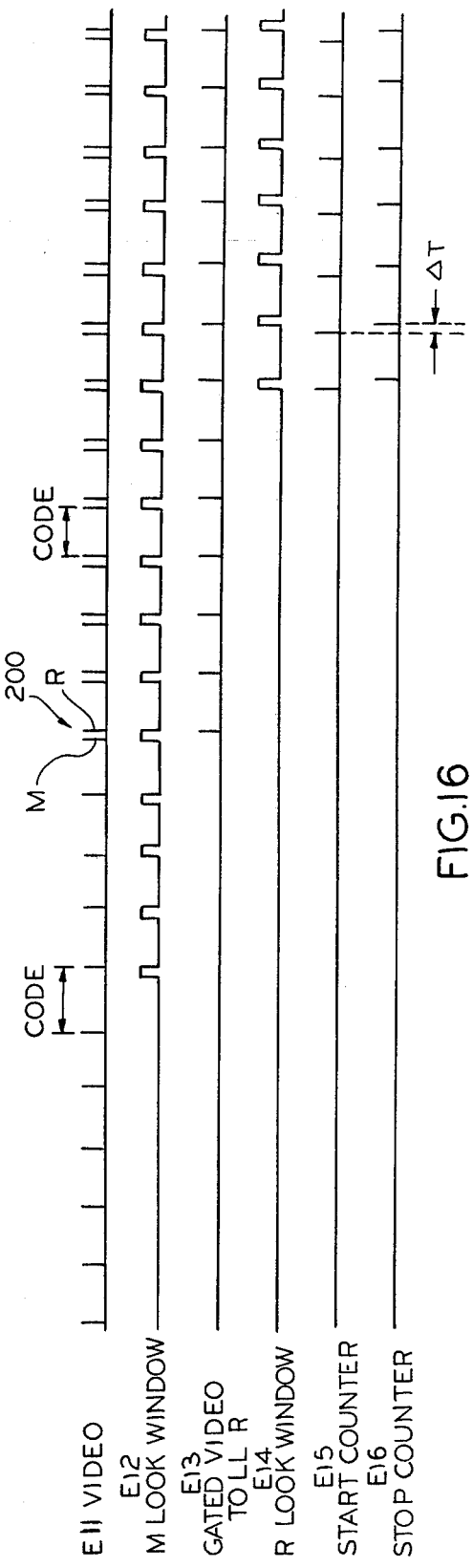

PULSE-HYPERBOLIC LOCATION SYSTEM USING THREE PASSIVE BEACON MEASUREMENTS

This invention relates to radio ranging and detecting systems for determining the geographical position of a station or another object at an unknown location, and more particularly to combined pulse-hyperbolic systems of a type which use passive radio signal repeaters.

Among the earliest of radio ranging systems are the so-called hyperbolic systems which gave way to the modern day pulse systems. The hyperbolic systems fell out of favor because they had to be orientated every time that a signal was lost. Also, the hyperbolic systems produced several possible answers responsive to the beacon signals. Because of these ambiguous readings, it was too cumbersome to interpret results unless there was ready access to a computer. In those days, few, if any, vehicles carried computers into the field.

Thereafter, pulse systems gained favor because they could use logic circuitry to produce quick answers. Also, pulse systems did not usually produce ambiguity wherein the search gave several equally accceptable results. Three patents owned by the assignee of this invention describe such a pulse system using techniques which are incorporated in this invention. These three patents are: Merrick U.S. Pat. No. 3,810,179, entitled "RADAR TRILATERALIZATION POSITION LOCATORS", issued May 7, 1974; Dano U.S. Pat. No. 3,938,146, entitled "SECURE ENCODER FOR TRILATERALIZATION LOCATOR UTILIZING. VERY NARROW ACCEPTANCE PERIODS", issued Feb. 10, 1976; and Metcalf U.S. Pat. No. 4,115,773, entitled "SYNCHRONIZED PULSE AMPLITUDE CONTROL FOR PULSE MEASURING CIRCUITS", issued Sept. 19, 1978. A reference to these three patents may be helpful to a better understanding of this invention. They show a system wherein the transponder stations continuously transmit a steady stream of beacon pulses which is energy consuming and requires a considerable band width of radio frequencies.

Actually, both the hyperbolic type of system and the pulse type of system include desirable advantages as well as unwanted disadvantages. Therefore, a beneficial system should incorporate the best of both systems, and eliminate the worst of both systems. The advent of microprocessors has made it possible to blend these two types of systems.

The new system incorporating the invention does not require continuously active repeater or transponder stations; therefore, there is no limit upon the number of stations or users in an area. Also, since only one frequency is used, and since no transponder or repeater signals are transmitted continuously by the users, the radio frequency spectrum is used more efficiently. An elimination of separate transmitters at the reference station eliminates costs and reduces complexity. The type of station identifying codes used by this invention enables adjacent systems to operate on the same frequency. Thus, the setup time for system operation is greatly simplified and shortened.

Accordingly, an object of the invention is to provide new and improved radio ranging and locating systems yielding the above described features and advantages. In this connection, an object is to provide low-cost surveying systems with an accuracy which is not only adequate for the general public, but also exceeds the accuracy of systems which have previously been available to them. In particular, an object is to provide systems of the described type for the shipping and boating public. Here an object is to provide means for finding shipping channels, harbor entrances, and the like.

Yet another object of the invention is to provide positioning information which is superior to that heretofore provided by existing equipment, such as Loran C equipment, for example.

In keeping with an aspect of the invention, these and other objects are accomplished by a system which transmits beacon pulses to a target station at an unknown location, the pulses being transmitted over a plurality of paths having different lengths. The system at the target station compares the arrival times of the pulses transmitted over these paths, and thereby determines the location of the target station receiving the pulses at the unknown location. The many stations in the system transmit all pulses at the same frequency and at the same pulse repetition rate. Individual repeater stations identify themselves by selectively dropping pulses. For example, one repeater retransmits every second pulse which it receives, while another repeater retransmits every third pulse.

A preferred embodiment of the invention is shown in the attached drawings wherein:

FIG. 1 is a block diagram showing the master and repeater stations used in the inventive system;

FIG. 2 is a schematic showing of the geographical layout of a master station, two repeater stations, and a receiving station at an unknown location, using the beacon pulse transmission plan of the invention;

FIGS. 3A–3B are three graphs explaining how the stations are identified by pulse repetition rates;

FIGS. 4A–4D are graphical representations showing how beacon supplied information is used to derive a point location for the station at the unknown location;

FIG. 5 is a block diagram broadly showing a target station controlled by a microprocessor;

FIG. 16 is a graph showing the various pulses which appear in the block diagram of FIG. 15; and FIG. 17 shows details of some of the blocks found in FIG. 16.

FIG. 1 is a simplified block diagram of a pulse-hyperbolic system which illustrates the principles of the invention. In practice, the system will almost certainly be larger and include more stations.

Figure 6:
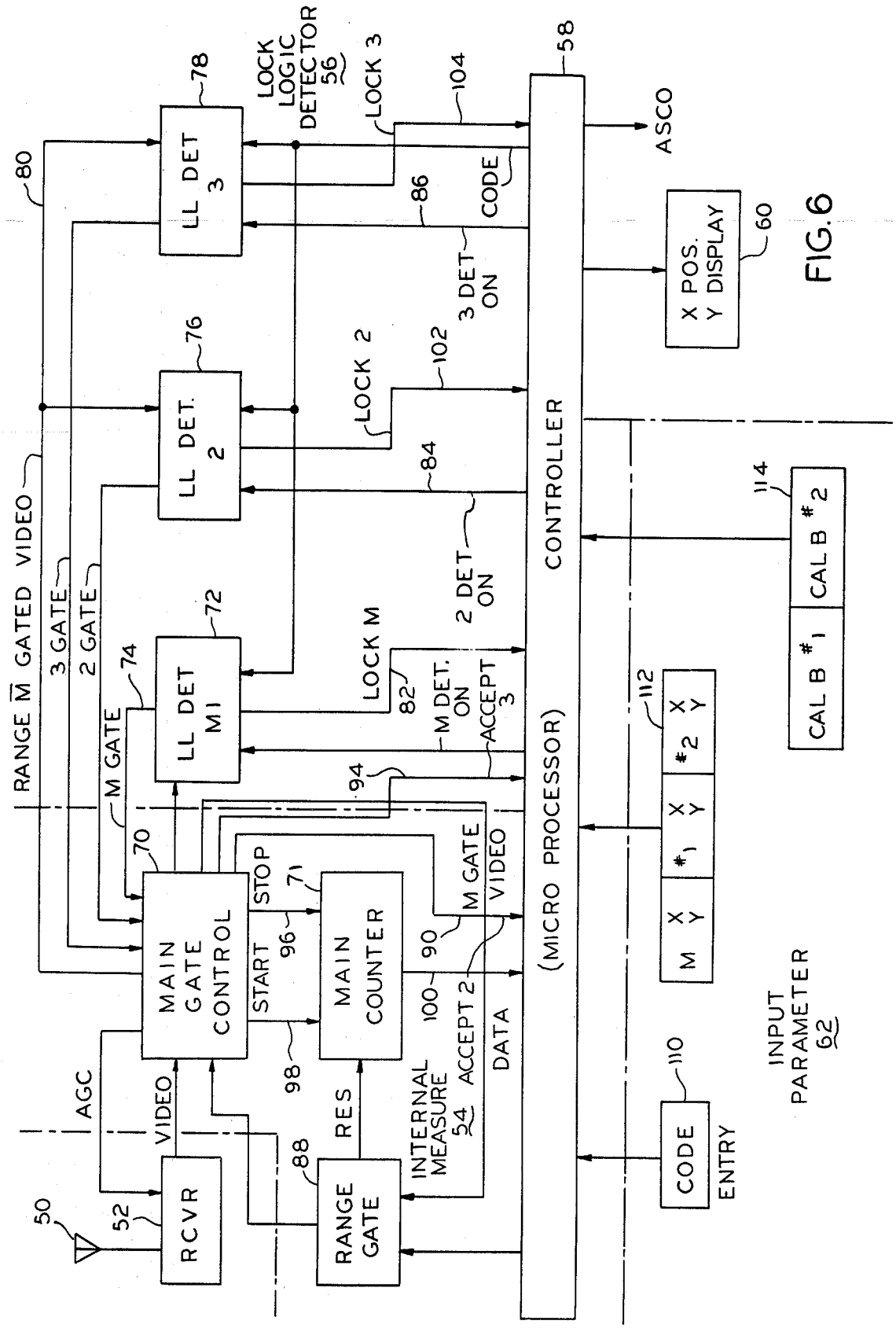
FIG. 6 is a block diagram showing equipment which completes the target station shown in FIG. 5.

The basic system includes a master station 20 for continuously transmitting beacon pulses during pulse bursts, and a repeater station 22 for repeating selected ones of the beacon pulses transmitted by the station 20. The master station 20 uses equipment and principles which are described in the Merrick U.S. Pat. No. 3,810,179 and in the Dano U.S. Pat. No. 3,938,146. A suitable counter controlled pulse generator 24 provides a coded stream of recurring pulses. The code resides in the beacon pulse repetition rate of recurring pulses.

The pulses are generated in batches which are separated by a predetermined pause interval. For example, each batch of pulses may include approximately 128 to 256 pulses followed by a silent pause of approximately 64 to 128 pulse periods, followed by another batch of 128 to 256 pulses, etc. Each radar pulse is fed into a transmitter 26 and then broadcast or radiated from an antenna 28. The silent pauses reduce the demands upon the system power supply, without causing any loss of resolution.

The repeater station 22 includes an antenna 30 which picks up the signals transmitted from the master station antenna 28. These picked-up signals pass from the antenna 30 through a duplexer 32 and a receiver 34 to a lock logic detector 36, of the type taught by Dano U.S. Pat. No. 3,938,146. As each of these signals is detected, it is fed into a counter 38 which provides a pulse skip logic control. That is, the pulse skip logic circuit 38 transmits only those pulses which occur during a selected prime number in the count sequence (e.g., the 2, 3, 5, 7 . . . pulses). The pulse transmitter 40 is arranged to transmit only those beacon pulses which identify the transmitting station. For example, repeater station #1 retransmits every second pulse that it receives, station #2 retransmits only every third pulse, station #3 retransmits only every fifth pulse, etc. The transmitted pulse is fed from the pulse transmitter 40 through duplexer 32 to the antenna 30, where it is broadcast or radiated.

FIG. 2 carries the description of the inventive system a step further by showing a master station 42, two repeater stations 44, 46, a target station 48 at an unknown location, and three separate pulse transmission paths: D1, D2, R2; and D3, R3. The object of this system is to accurately locate the target station 48 which may be on a moving boat or other vehicle, for example, at an unknown position. The master station 42 transmits a stream of uniformly recurring pulses in a radio frequency wave form, as shown in FIG. 3A. This steady stream of pulses has a repetition rate which is the basis of the identification scheme for the entire system.

Repeater station #1 (44) detects each beacon pulse transmitted by the master station 42. After a slight delay, caused by the turnaround time, the repeater station #1 (44) retransmits every second pulse that it receives, as seen in FIG. 3B. Likewise, the repeater station #2 (46) also detects every master station sent pulse, but it retransmits only every third pulse, as seen in FIG. 3C. Thus, each of the three stations in this system has a different, individually identifying pulse repetition rate which occurs responsive to a pulse dropping scheme.

As indicated in FIG. 3B, there is a delay between the transmission of a pulse from a master station and the retransmission of pulses by the repeater station, which occurs because a propagation time is required to transmit the pulses between the stations.

FIGS. 4A–4D are graphs which illustrate the propagation times in the various transmission paths of the system (FIG. 2) and indicate the time intervals which can be measured at the target or receiving station 48. Turnaround time is neglected in FIGS. 4A–4D, since it merely behaves as another system constant.

The graph of FIGS. 4A–4D indicate the signals received at point P or target station 48. The master station 42 transmits a pulse at time 0. One path requires the pulse to travel from station 42 over link R2 to repeater station 44, and then over link D2 to the target station at the unknown location P. The lengths of the line R2, D2 in FIG. 4A indicate the time required for the pulse to travel over the corresponding links in FIG. 2. Thus, the pulse transmitted over this path arrives at point P (target station 48) at time $t_1$.

A second path involves the links R3, D3. Since path R3 is shorter than path R2, the segment R3 (FIG. 4B) is shorter than the segment R2 (FIG. 4A). Likewise, since the path D3 is longer than path D2, the segment D3 is longer than the segment D2. The pulse transmitted over the path R3, D3 arrives at target point P at time $t_2$.

A third path is the direct one D1 (FIG. 2), and the pulse transmitted over this path arrives at target point P at time $t_3$ (FIG. 4C). Since the path D1 is the shortest one, the pulse received over this path is the first to arrive (time $t_3$) at target point P. The pulses received at target point P, at time $t_3$, have the pulse repetition rate of FIG. 3A. The pulses received at target point P, at time $t_1$, have the pulse repetition rate of FIG. 3B. The pulses received at target point P, at time $t_2$, have the pulse repetition rate of FIG. 3C. Equipment at target point P can easily relate all of these received pulses to the same time base of FIG. 3A, at which they were originally transmitted from the master station 42, because all pulses occur at time periods which are multiples of the master station transmission rate. Also, the turnaround times and inherent system delays are easily subtracted. Thus, these two factors (repetition rate and turnaround time) are ignored in the bar graph of FIGS. 4A–4D.

From the viewpoint of the equipment at the unknown location (target point P), the only available information is the time period $t_4$ which begins when a pulse is received over the direct path D1 and ends when a pulse is received over the next shortest path R2, D2 and the time $t_5$ which also begins with the first received pulse and ends when a pulse is received over the next longer path R3, D3. Thus, the equipment at the unknown location must calculate the location of target point P from an analysis of times $t_4$, $t_5$. In these calculations, the lengths of the two paths R2, R3 remain constant. The three distances D1, D2 and D3 change as a vehicle moves its location at target point P.

The block diagram of a receiver at the unknown location (point P) is seen in FIG. 5. In general, the nature of the circuits in FIG. 5 is apparent from Merrick U.S. Pat. No. 3,810,179 and Metcalf U.S. Pat. No. 4,115,773. The received pulses are fed from the antenna 50 through the receiver 52 to a counter 54 which measures the interval between successive pulses. Therefore, the circuit 54 identifies the station that is then transmitting a pulse. The lock logic detector 56 arms the target station to receive and accept pulses during only a very narrow acceptance window and thereby increase reliability, as taught in the above patents. (Circuit 56 is described in detail in Dano U.S. Pat. No. 3,938,146.) The interval measure circuit 54 also extracts the duration of the time periods $t_4$, $t_5$, (FIGS. 4A–4D) and passes the resulting information to the controller 58.

The controller 58 is a microprocessing operating under a fixed program to calculate target location from time periods $t_4$, $t_5$. The calculated results are displayed in an output data circuit 60. The information relating to the system constants are the input parameters which may be keyed into the controller 58 from circuit 62.

FIG. 6 is a more detailed showing of the FIG. 5 system which receives the beacon signals at the target point P. Dot-dashed lines separate FIG. 6 into the functional component circuits corresponding to the blocks of FIG. 5. Where possible the same reference numerals identify the same parts in FIGS. 5 and 6. The operations of FIG. 6 are explained by the timing diagram of FIG. 7.

The incoming radar pulses are received at antenna 50 and processed through a receiver 52. The output of the receiver 52 is a "video" signal which is fed into a main control gate 70 that sorts out and delivers the pulses to other circuits. The main control gate 70 feeds back an automatic gain control signal AGC to adjust the gain of the receiver 52.

Figure 7:
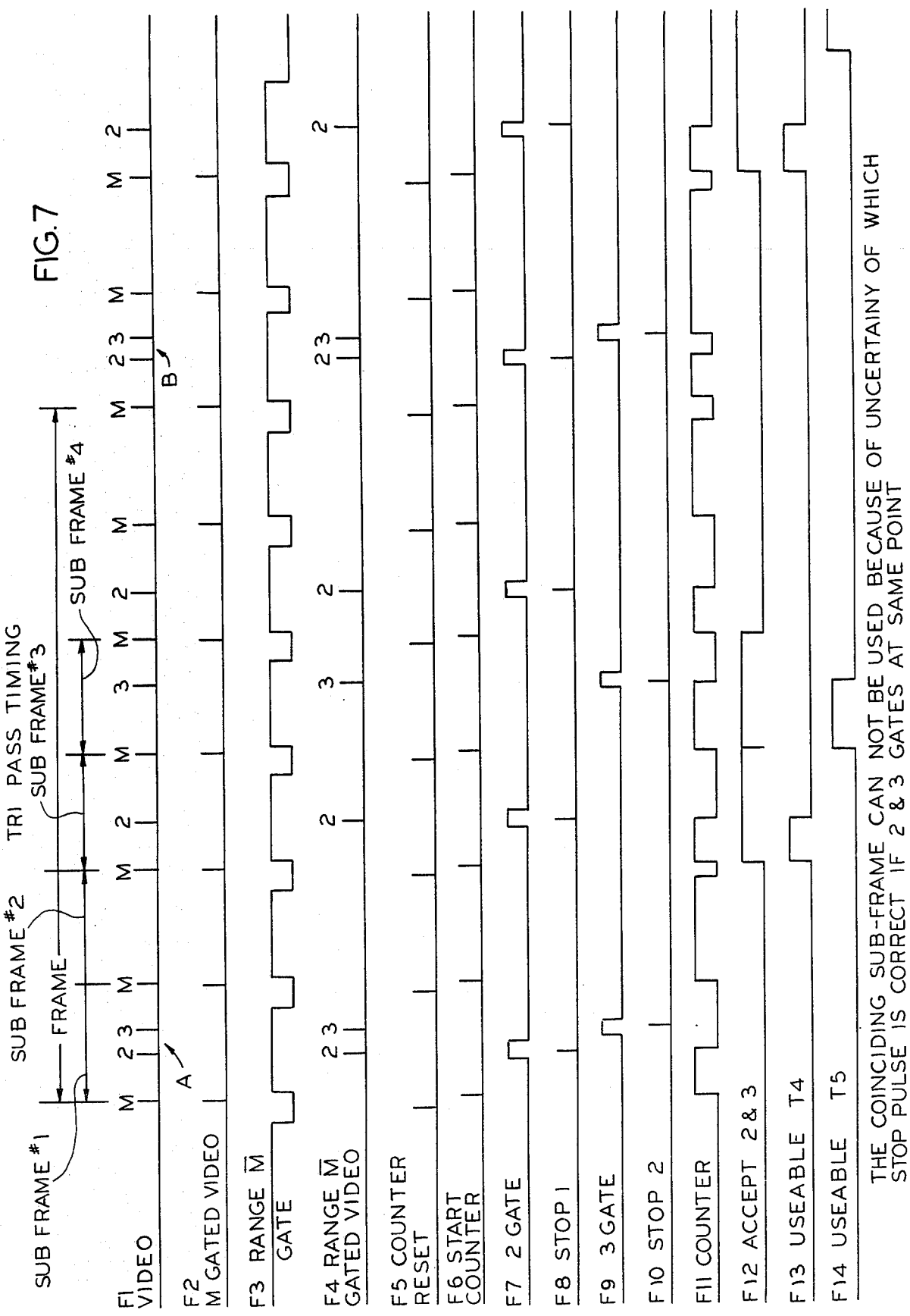
FIG. 7 is a timing chart which explains the operation of the equipment of FIG. 6.

The first or "F1" line in FIG. 7 shows the "video" signals which pass from the receiver 52 to the main control gate 70. The pulses or signals (FIG. 3A) transmitted from the master station 42 are marked "M" in the F1 (FIG. 7). The signals (FIG. 3B) from repeater station #1 (44) are marked "2" in FIG. 7. The signals (FIG. 3C) from repeater station #2 (46) are marked "3" in FIG. 7.

The main gate control 70 circuit steers the pulses to the other circuits which process them. A lock logic detector (taught in the Dano U.S. Pat. No. 3,938,146) for master pulses (LL DET. M1) 72 measures time periods corresponding to the known pulse periods of the master station (FIG. 3A) and enables a very narrow acceptance window line F3 (FIG. 7) during which a master pulse must be received. Each time that such a pulse appears with this critical timing relationship, an M-gate signal (line F2, FIG. 7) is fed back to the main gate control circuit 70 via wire 74. The M pulses are then used by the main gate control circuit 70 to start or stop a main counter circuit 71 to indicate an arrival of a valid impulse to the controller 58.

More particularly, the master pulses M, returned over wire 74, are used in the gate control circuit 70 to start the main counter circuit 71. Also, by using the range gate 88, the main gate control 70 selectes pulses which are fed over the wire 80 and into the lock logic detectors 76, 78 for pulses "2" and "3", respectively.

Line F4 (FIG. 7) indicates the train of pulses which the main gate control circuit applies over the wire 80 to circuits 76, 78. The "2" and "3" signals seen in line F4 are used and detected by the circuits 76, 78 which return them to the main gate control circuit 70 via the "2 GATE" and "3 GATE" wires. The "2" and "3" pulses are identified by a countdown which results in a look window (line F7) during which a "2" pulse must appear, and a look window (line F9) during which a "3" pulse must appear if it is to be accepted—again as taught by the Dano U.S. Pat. No. 3,938,146. Any incoming signal which occurs during the look window at the end of a counting period is accepted by circuits 76 or 78 as either a "2" or a "3" pulse, respectively.

The controller 58 is a microprocessor which exercises control over the system at the point P (i.e., the controller 58 controls and coordinates the timing, as shown in FIG. 7). The basic code is the spacing of the master station pulse periods (FIG. 3A). The spacing of the other pulses are multiples of the master station pulse periods. That is, the detector 76 operates at twice the basic master code pulse period, and the detector 78 operates at three times the basic pulse period. If more stations are used, their identifications are a prime number 5, 7, 11, etc., times the basic period of the M pulse.

The controller 58 takes in the M pulses under control of the M1 LL DET. circuit 72 responsive to signals sent over the wire 82. The controller 58 inserts all of the appropriate delays and the standard system corrections, and then it enables the circuits 76, 78 via wires 84, 86, respectively, when the "2" and "3" pulses are expected. The M pulses are thus filtered out responsive to the controller, as shown in line F4 (FIG. 7).

The controller 58 now supplies all of the pulses which are used for controlling the operation of the circuit of FIG. 6. These pulses include the counter start pulses of line F6 (FIG. 7) and stop pulses of line F8, F10. The operation of the main counter 71 is shown in line F11. The microprocessor or controller 58 makes suitable comparisons with previously received data and indicates whether the apparent pulses are or are not acceptable as plausibly being the pulses which they appear to be. Then, the controller 58 signals through the range gate circuit 88 to the main gate control circuit 70 and the main counter 71. They mark the wires 90, 94 to indicate that the pulses have been accepted.

The top headings of FIG. 7 have been labelled to indicate and identify a frame and a subframe. The frame is one complete cycle of pulses. (Note how the pulses "2" and "3" recur at the same relative places A, B after the start of each frame.) A subframe is the space between each succeeding M pulses (here there are six subframes per frame.)

On the other hand, the pulses "2" and "3" in subframes #3, #4 are easily separated, and they are far enough apart to give reliable results. Therefore, the stations are set up at locations which give a reliable reading when these pulses are used.

Accordingly, the controller 58 is programmed to accept the pulses "2" and "3" during the third and fourth subframes. Lines F13 and F14 (FIG. 7) indicate the time periods $t_4$, $t_5$ (FIG. 4D) which are derived during only the third and fourth subframes. Thus, the alternative possible locations in other subframes are rejected by the controller 58.

The decision making circuitry is seen in FIG. 6. Each time that the main gate control circuit 70 receives an M gate pulse confirmation via wire 74, it marks a STOP lead 96 to stop a preceding count cycle, and marks a START lead 98 to start the next count cycle in the main counter 71. Each time that the main counter 71 is stopped, the data which it has acquired is held in a buffer memory and applied over a "Data" lead 100 to the controller 58. The data is held in the buffer memory for a period which is long enough for the controller 58 to receive signals indicating the receipt of the pulses "2" and "3" via wires 102, 104. The controller 58 can easily recognize the subframe after the pulses "2" or "3" have been received. Thus, the decision as to whether the data stored in the buffer memory is plausible may be made later in a subframe, after all factual evidence is received.

A predetermined number of the $t_4$ and $t_5$ pulses may be accumulated and averaged to provide highly accurate readings, as taught in the Merrick U.S. Pat. No. 3,810,179. In experimental systems actually built and tested, the target position locations have been accurate to within a half meter, which is much better than the accuracy of the older types of similar systems, such as the Loran systems.

Once a suitable number of acceptable pulses $t_4$ and $t_5$ have been found, there are a number of ways to translate them into a position location. One way is by some rather complicated mathematics which is known to navigators. However, these old and cumbersome methods are not required, since a microprocessor can calculate positions quite easily responsive to a direct observation of the received beacon pulses.

The microprocessor 58 may convert the signals into X and Y coordinates in a grid system which is preprogrammed into the microprocessor. These coordinates may also be latitude and longitude readings.

The preprogrammed data is entered into the microprocessor by suitable controls in the input parameter system 62. These controls include a suitable console 110 for entering station identification code information. Another console 112 is used for entering the X and Y coordinates of the master station 42 (FIG. 2), repeater station #1 (44) and repeater station #2 (46). Also, suitable calibration information may be entered via a console 114. This calibration information could include the turnaround time required within a repeater to receive and then retransmit a pulse, for example.

The calculated position location of target point P is displayed by a suitable readout and display device 60. The calculations for deriving this information are given below. It is a simple matter to program a microprocessor to perform these mathematical calculations.

Figure 8:
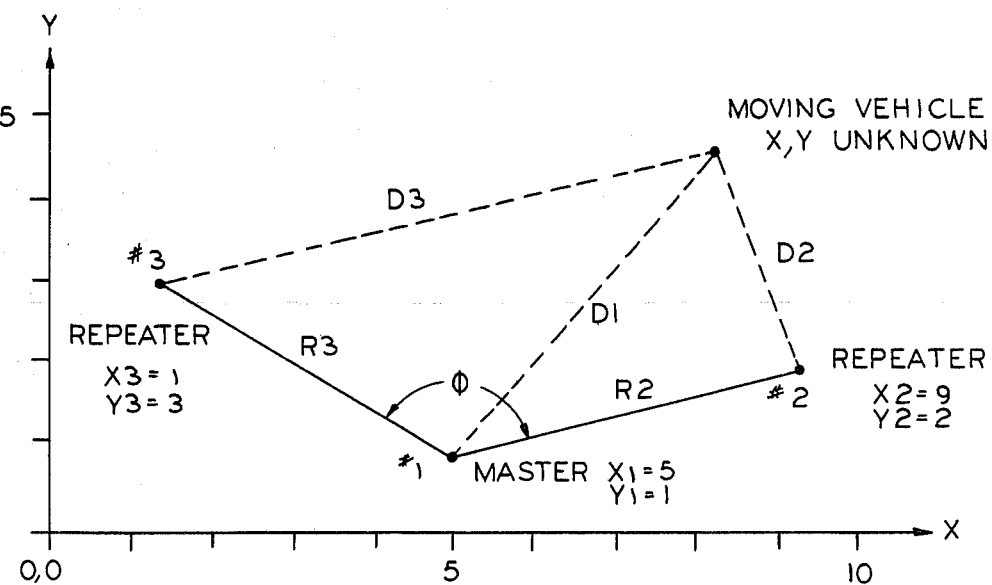
FIG. 8 is a geographical layout of system stations with locations set forth in terms of an X, Y grid, which layout is used in a mathematical analysis that explains how the microprocessor is programmed.

FIG. 8 is essentially the same as FIG. 2, redrawn to show a passive positioning configuration superimposed on an X, Y grid. Three stations of known coordinates (X1, Y1), (X2, Y2), and (X3, Y3) are set up on the same horizontal plane. A vehicle, which is to be located, moves in this horizontal plane. The distances between the moving target vehicle and the three stations are D1, D2, D3, respectively. The distance between repeater station #2 (station #3) and master station 1 is R2 (R3).

Mathematical Problem:
(a) Given: (X1, Y1), (X2, Y2), (X3, Y3), R3+D3−D1, and R2+D2−D1,
(b) Find: (X, Y) coordinates of the moving target vehicle.

Mathematical Solution:
The solution can be simplified if a polar coordinate is used in a new axis coordinate system. The new X', Y' coordinate system is formed by locating station #1 on the origin with the baseline connecting station #1 and station #2 as the X' axis, as shown in FIG. 9.

Figure 9:
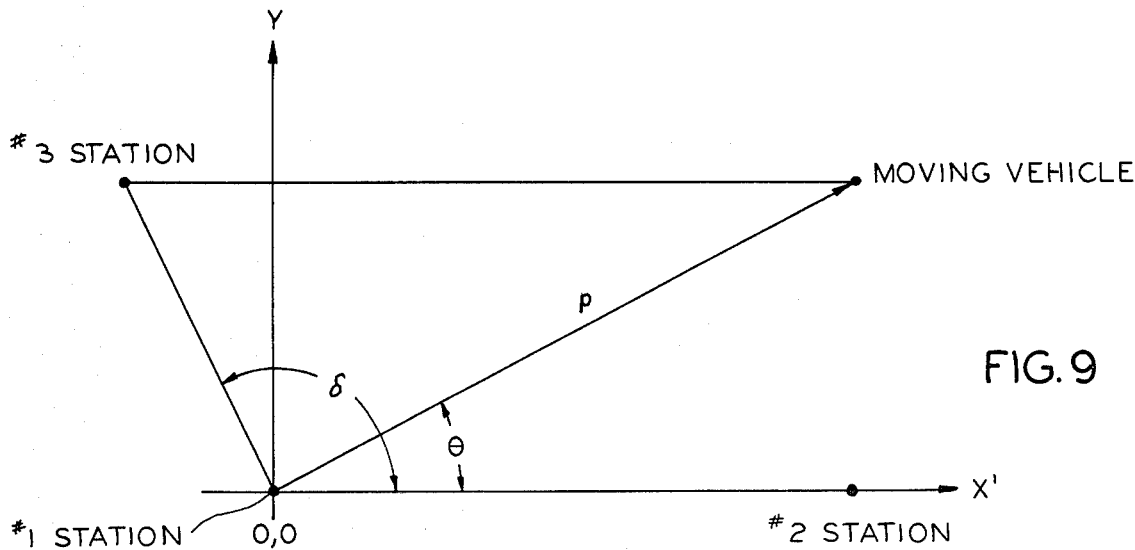
FIGS. 9 and 10 are the same as FIG. 8 except that polar coordinates are used to identify the station positions.

The polar coordinate of the vehicle in the X', Y' coordinate system can be represented by $(\rho, \theta)$ where $\rho$ is the radial distance of the moving vehicle from the origin (station #1), and $\theta$ is the angle between $\bar{\rho}$ and the X' axis as shown in FIG. 9.

The rectangular coordinate (X', Y') corresponding to the polar coordinate $(\rho, \theta)$ is:

$$X' = \rho \cos \theta$$

$$Y' = \rho \sin \theta.$$

The polar coordinate of station #2 is (R2, 0), the polar coordinate of station #3 is (R3, $\delta$), $$\text{where } R2 = \sqrt{(X2 - X1)^2 + (Y2 - Y1)^2}$$

$$R3 = \sqrt{(X3 - X1)^2 + (Y3 - Y1)^2} .$$

The angle $\delta$ can be computed. The method of doing this will be described hereinafter. For the time being, assume that it is known.

The distance between the moving vehicle $(\rho, \theta)$ and station #3 (R3, $\delta$) is:

$$D3 = \sqrt{(\rho\cos\theta - R3\cos\delta)^2 + (\rho\sin\theta - R3\sin\delta)^2}$$

$$= \sqrt{\rho^2\cos^2\theta - 2\rho R3\cos\theta\cos\delta + R3^2\cos^2\delta + \rho^2\sin^2\theta - 2\rho R3\sin\theta\sin\delta + R3^2\sin^2\delta}$$

$$= \sqrt{\rho^2(\cos^2\theta + \sin^2\theta) + R3^2(\cos^2\delta + \sin^2\delta) - 2\rho R3(\cos\theta\cos\delta + \sin\theta\sin\delta)}$$

$$= \sqrt{\rho^2 + R3^2 - 2\rho R3\cos(\delta - \theta)} .$$

Since $\cos^2\theta + \sin^2\theta = 1$ for any $\theta$ and, $\cos\theta \cos\delta + \sin\theta \sin\delta = \cos(\delta - \theta)$
Similarly:

$$D2 = \sqrt{\rho^2 + R2^2 - 2\rho R2 \cos(0 - \theta)}$$

$$= \sqrt{\rho^2 + R2^2 - 2\rho R2 \cos\theta}$$

We know: $T3 = R3 + D3 - D1 = R3 + D3 - \rho$ ($D1 = \rho$) and $T2 = R2 + D2 - D1 = R2 + D2 - \rho$ $$\text{i.e. } T3 = R3 + \sqrt{\rho^2 + R3^2 - 2\rho R3 \cos(\delta - \theta)} - \rho \quad (1)$$

$$T2 = R2 + \sqrt{\rho^2 + R2^2 - 2\rho R2 \cos\theta} - \rho \quad (2)$$

The problem now is how to solve $\rho, \theta$ from Equations (1) and (2) above.
From Equation (1):

$$T3 + \rho - R3 = \sqrt{\rho^2 + R3^2 - 2\rho R3 \cos(\delta - \theta)} \quad (3)$$

Take square on both sides of Equation (3), we have:

$$(T3 + \rho - R3)^2 = \rho^2 + R3^2 - 2\rho R3 \cos(\delta - \theta)$$

$$T3^2+\rho^2+R3^2+2T3\rho-2T3R3-2\rho R3=\rho^2+R3^2-2\rho R3\cos(\delta-\theta)$$

$$T3^2-2T3R3+2\rho(T3-R3)=-2\rho R3\cos(\delta-\theta)$$

$$T3\cdot(T3-2R3)-2\rho(R3-T3)=-2\rho R3\cos(\delta-\theta)$$

let:

$$B3=T3\cdot(T3-2R3)$$

$$A3=R3-T3$$

we have:

$$B3-2A3\rho=-2\rho R3\cos(\delta-\theta)$$

$$B3=2\rho(A3-R3\cos(\delta-\theta)) \quad (4)$$

Similarly, we can derive:

$$B2=2\rho(A2-R2\cos\theta) \quad (5)$$

where:

$$B2=T2\cdot(T2-2R2)$$

$$A2=R2-T2$$

Dividing Equation (5) by Equation (4) to eliminate $\rho$:
We have:

$$\frac{B2}{B3}=\frac{A2-R2\cos\theta}{A3-R3\cos(\delta-\theta)} \quad (6)$$

Let:

$$Ad=B2/B3,$$

Equation (6) becomes:

$$Ad=\frac{A2-R2\cos\theta}{A3-R3\cos(\delta-\theta)}$$

$$A2-R2\cos\theta = AdA3 - AdR3\cos(\delta-\theta)$$
$$= AdA3 - AdR3(\cos\delta\cos\theta + \sin\delta\sin\theta)$$
$$(A2-AdA3) + (AdR3\cos\delta - R2)\cos\theta$$
$$= -AdR3\sin\delta\sin\theta \quad (7)$$

Let:

$$Ae=A2-Ad\,A3$$

$$Af=Ad\,R3\cos\delta-R2$$

$$Ag=-Ad\,R3\sin\delta$$

Equation (7) can be written as:

$$Ae+Af\cos\theta=Ag\sin\theta \quad (8)$$

Squaring both sides of Equation (8):

$$(Ae+Af\cos\theta)^2 = Ag^2\sin^2\theta$$
$$Ae^2 + 2AeAf\cos\theta + Af^2\cos^2\theta = Ag^2\sin^2\theta$$
$$= Ag^2(1-\cos^2\theta)$$
$$= Ag^2 - Ag^2\cos^2\theta$$
$$(Af^2+Ag^2)\cos^2\theta + 2AeAf\cos\theta + (Ae^2-Ag^2) = 0 \quad (9)$$

Equation (9) is a standard second-order linear equation in the unknown variable $\cos\theta$.

Hence: $$\cos\theta=\frac{-AeAf\pm\sqrt{Ae^2Af^2-(Af^2+Ag^2)\cdot(Ae^2-Ag^2)}}{Af^2+Ag^2} \quad (10)$$

From Equation (8):

$$\sin\theta=\frac{Ae+Af\cos\theta}{Ag} \quad (11)$$

From Equation (5):

$$\rho=\frac{B2}{2(A2-R2\cos\theta)} \quad (12)$$

Equations (10), (11), and (12) combine to give the solution for $\theta$ and $\rho$. Equation (10) gives two solutions for $\cos\theta$. In most cases, only one value of $\cos\theta$ will give a positive value of $\rho$. In certain areas, both values of $\cos\theta$ will give positive $\rho$ values, thus resulting in two solutions.

The rectangular coordinate in the new X', Y' axis coordinate is:
$$X'=\rho\cos\theta$$

$$Y'=\rho\sin\theta.$$

Figure 10:
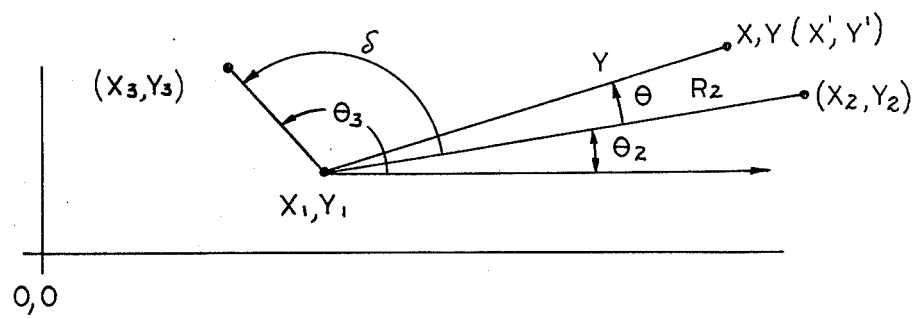

Referring to FIG. 10, the coordinate X, Y of the moving vehicle is calculated by using the conventional coordinate translation and rotation formula:

$$X=X'\cdot\cos\theta2-Y'\cdot\sin\theta2+X1$$

$$Y=Y'\cdot\cos\theta2+X'\cdot\sin\theta2+Y1$$

where $\theta2$ is the angle between the X axis and R2.

$$\cos\theta2=X2/R2,\ \sin\theta2=Y2/R2.$$

The angle $\delta$ between the two baselines can be calculated as (referring to FIG. 10):

$$\cos\delta=\cos(\theta3-\theta2)=\cos\theta3\cos\theta2+\sin\theta3\sin\theta2$$

$$=\frac{X3}{R3}\cdot\frac{X2}{R2}+\frac{Y3}{R3}\cdot\frac{Y2}{R2}$$

$$\sin\delta=\sin(\theta3-\theta2)=\sin\theta3\cos\theta2-\cos\theta3\sin\theta2$$

$$=\frac{Y3}{R3}\cdot\frac{X2}{R2}-\frac{X3}{R3}\cdot\frac{Y2}{R2}$$

$$\sin\delta=\sin\theta3\cos\theta2-\cos\theta3\sin\theta2$$

$$=\frac{Y3}{R3}\cdot\frac{X2}{R2}-\frac{X3}{R3}\cdot\frac{Y2}{R2}.$$

Although two answers are possible in certain areas, the geometric layout of the master station and the two repeater stations can be such that unique answers are obtained in an area of concern. For example, FIG. 8 is a typical layout for, say, using the transponders of the above patents, as the transmitting network. For illustration, "M" is the master transmitter and repeater stations 2 and 3 are transponder tuned to receive and transmit on the same frequency with drop pulses, as described earlier.

Assuming a transmitter-to-receiver communications capability of fifty miles, and the repeaters are about sixteen miles from the master, a work area of about 2,000 square miles can be covered. Note that the two baselines (M to 2 and M to 3, FIG. 8) are at angle φ. This is purposely done so that a unique solution is available in the work area encompassed by the lines R2, R3, D2, D3.

If 360° antennas are used, the backside of the "V" could also be used; however, the answers are not unique on the backside of the "V". Although there would be two answers, the system can be used if a history of the various positions is used to eliminate one of the answers.

Figure 11:
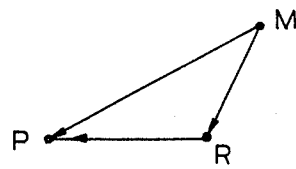
FIG. 11 is a system layout showing a use of three stations to locate a target station.

FIG. 11 shows an alternative method of acquiring the differential travel times T4 and T5 which provides another embodiment of the invention. The previously displayed mathematical solution of target P position based upon hyperbolic differential propagation travel (Delta) time applies also to the following demonstration. Rather than resolving a particular remote return by position in a missing pulse frame scheme, each remote station transmission is identified by a different code (upon the same radio frequency). As previously shown, it is essential to acquire two "Delta" times, namely T4 and T5, from two remote stations, respectively. Although these two differential travel times are necessary and sufficient for the mathematical solution, only one "Delta" time acquisition will be examined below since subsequent "Delta" times are redundant. Hence, the three stations are master station M, a repeater R, and the target position P.

Figure 12A:
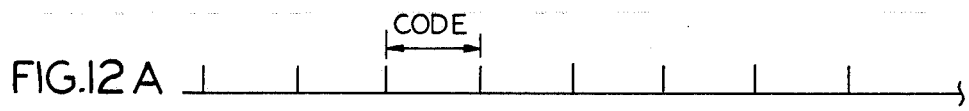
FIGS. 12A–12C are graphs which show the pulses that are transmitted from the various stations through the system of FIG. 11.
Figure 12B:
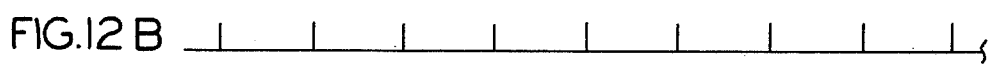
Figure 12C:
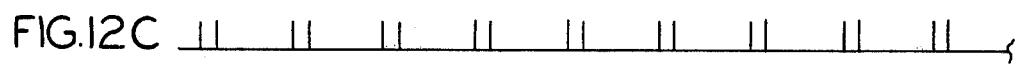
Figure 13:
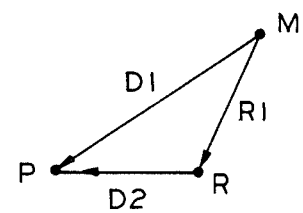
FIG. 13 is a vector layout wherein the lengths of the arrows represent propagation time for radar signals transmitted over the various paths in the system of FIG. 11.

The master station transmits a finitely long stream of pulses (FIG. 12A) at a pluse repetition rate which is a station identifying code (as indicated in FIGS. 12A-12C by the word "Code").

Both the repeater station R and the target station P receive the pulses (FIG. 12A) transmitted by the master station M. The repeater R retransmits one pulse responsive to each pulse that it receives. Thus, each of the pulses (FIG. 12B) transmitted by the repeater station R is delayed significantly to follow the corresponding pulse (FIG. 12A) transmitted from the master station M. The delay represents the propagation time of the pulses and the turnaround time within the repeater. The delay guarantees that the target station P receives a stream of twin pulses, as seen in FIG. 12C. One pulse of each twin is transmitted by master station M and the other pulse is transmitted by the repeater station R.

The method of analysis which was used above to explain FIGS. 4A-4D is used to FIGS. 13, 14A-14C to explain the embodiment of FIG. 11. The distance between the master station M and the target station P is represented by the arrow D1 (FIG. 13), and the signal propagation time is represented by the length D1 of FIG. 14A. The distances between the master station M, the repeater station R, and the target station P are represented by the arrows R1 and D2, and the signal propagation times are represented by R1, D2 of FIG. 14B. The time Q (FIG. 14B) indicates the delay caused by the turnaround time within the repeater itself.

Figure 14A:
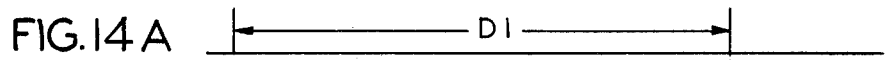
FIGS. 14A–14C are bar graphs illustrating the propagation time for signals transmitted through the system and identifying a time differential used to calculate distances.
Figure 14B:
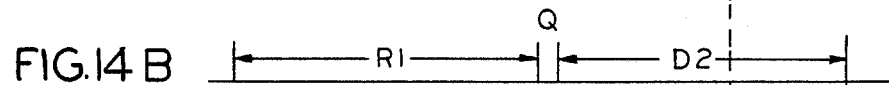
Figure 14C:
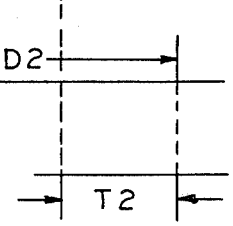

The time period separating the twin pulses (FIG. 12C) received at the target position station P is indicated by T2 of FIG. 14C. The equipment at the target station P calculates the equivalent time period $t_4$ (FIG. 4D) by subtracting the turnaround time Q from T2.

Figure 15:
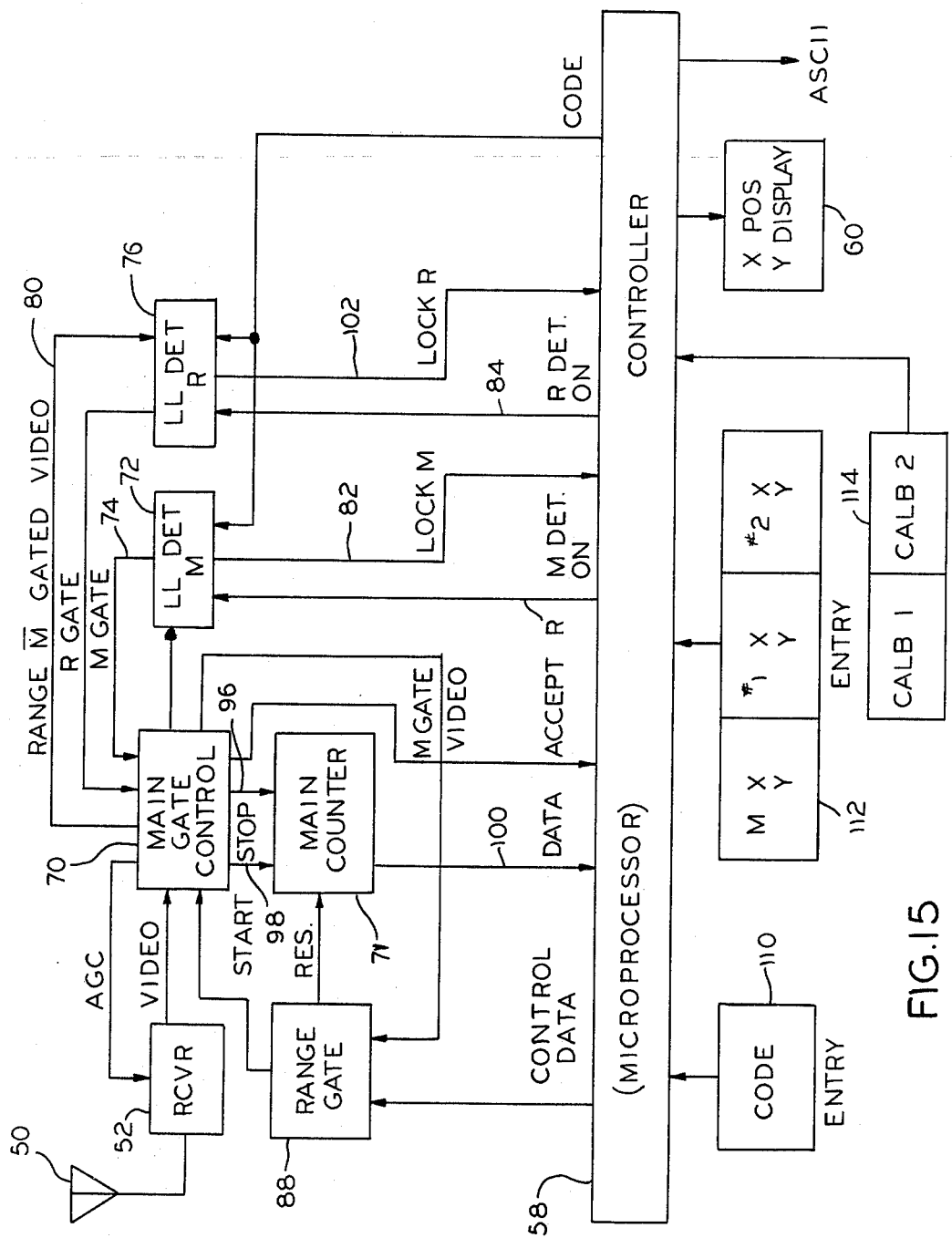
FIG. 15 is a block diagram of the receiver system at the target station.

The target station in the system of FIG. 11 is approximately the same as the station shown in FIG. 5. The block diagram of the target station P (FIG. 11) is seen in FIG. 15. In general, this block diagram (FIG. 15) is the same as that of FIG. 6, except that the provisions for a second LL detector have been omitted. The same reference numerals are used to identify the same parts in FIGS. 6 and 15, and their description will be omitted at this point.

FIG. 11 (as compared to that of FIG. 2) can be understood by a comparison of FIGS. 7 and 16. In greater detail, line E11 of FIG. 16 shows the incoming beacon (or "video") pulses received at the target station P and supplied to the "main gate control" circuit 70 (FIG. 15). Line E11 also shows that (after ten pulses) the repeater station R begins its response and then it sends its pulses, the second of the twin pulses, as shown at 200 ("M" designates the pulse sent by the master station and "R" designates the pulse sent by the repeater station).

At the target station P, the lock logic detector 72 (FIGS. 15, 17) locks onto the master station pulses. The lock logic circuits are described in the above identified patents, especially the Dano U.S. Pat. No. 3,938,146. Responsive to the operation of circuit 72, a number of "look window" pulses are generated, as shown in line E12 of FIG. 16. Note that the master look window pulses begin after six of the beacon or "video" pulses are received from the master station. Therefore, these look window pulses are available before the repeater begins to transmit. The master pulse must coincide with these master look window pulses in order to be accepted as apparently valid pulses. The master lock logic circuit 72 also serves a secondary purpose of blocking or inhibiting the master pulses from the input of the repeater lock logic circuit 76.

The circuit for accomplishing this inhibiting function is seen in FIG. 17. In greater detail, the "video" signals (line E11, FIG. 16) cause signals to appear on the input 210. These video signals are also applied to the lower input of a NAND gate 212.

The gating of the video signal 210 by the look window of LL DET. M 72 (signal 216 of FIG. 17) at NAND gate 212 produces an M-gated video E13 (FIG. 16) such that only transmissions from the repeater are available to LL DET. R 76.

The M-gate video signal (line E13, FIG. 16) has the same code (pulse repetition rate) as the master station code.

The repeater lock logic circuit 76 counts six pulses (line E13, FIG. 16) and then it begins to generate its own look window pulse (line E14, FIG. 16). The repeater sent pulses must occur during these narrow repeater look windows. The time restrictions of these repeater look window pulses (line E14) exclude a response to the pulses sent by the master station, just as the master station look window pulses (line E12) exclude a response to pulses sent by the repeater station. Hence, the system can now separate the master station sent signals M (200) and the repeater sent signals R. The turnaround time delay in the repeater (Q in FIG. 14B) is made long enough to accommodate the practical requirements of the look window pulses (lines E12 and E14) to preclude a faulty response which might otherwise occur if, say, a master pulse could occur after the beginning of a repeater look window.

The Merrick U.S. Pat. No. 3,810,179 describes how the output pulses of a quartz controlled oscillator are counted in order to establish a code based upon a pulse repetition rate. The video or beacon pulse received in the receiver look window marks wire 214 and starts the counter (line E15, FIG. 16).

An acceptable repeater sent beacon pulse signal marks wire 218 and stops the counter (line E16, FIG. 16). Thus, a "Delta T" signal is sent to the microprocessor 58. The microprocessor 58 may generate "range gate" signals based upon the Delta T. These range gate signals preclude a response to any other beacon pulses. Thus, the system is immune to randomly occurring noises which simulate beacon pulses (such as false echoes).

The microprocessor counts a predetermined number of Delta T times and, after an acceptance of a predetermined number of them, the microprocessor assesses them as an accurate measurement.

After the microprocessor finds that an accurate measurement has been achieved, it switches the code, and the system responds to another pulse repetition rate, thereby measuring another differential travel time.

Upon measuring two necessary and sufficient differential times (from a single master to each of two repeaters), the position may be computed in the same manner as previously described.

Those who are skilled in the art will readily perceive how to modify the structure, within the scope and spirit of the invention. Therefore, the claims are to be construed to cover all equivalent devices.

We claim:

1. A radio ranging and navigation system comprising a master station, a target station at an unknown location, and at least one repeater station at a separated location, whereby there are at least two separate paths between said master station and said target station, means at said master station for transmitting cyclically recurring pulses at basic system identifying repetition rates, and means at said repeater station for dropping some of said recurring pulses and retransmitting other of said recurring pulses, said retransmitted pulses having a pulse repetition rate which is a prime number multiple of said basic system identifying repetition rate.

2. The radio syatem of claim 1 wherein there are at least two of said repeater stations and at least three of said separate paths.

3. The radio system of either claim 1 or claim 2 and antenna means at each of said stations for transmitting said pulses, each of said antenna means having a transmission or reception pattern which eliminates hypothetical target locations which appear responsive to a multiplicity of theoretical mathematical calculations based on the receipt of said pulses.

4. A passive radio ranging system for locating a station at a target position and an unknown location, said system comprising a radio frequency pulse transmitter means at a first known location for periodically transmitting a discrete number of cyclic pulses recurring at a system identifying pulse repetition rate, at least one radio frequency pulse repeater means at another separated but known geographical location for receiving pulses which recur at said system identifying pulse repetition rate and for selectively dropping some and retransmitting other of said pulses, said stations being identified by the pulses which are dropped and those which are retransmitted by that station, and calculating means at said target position responsive to time differentials required to receive pulses from said first known location and said repeater means at said another location for calculating the location of said target means.

5. The system of claim 4 wherein each known location in said system is at a position identified by coordinates of a grid system, and said means for calculating said location comprises means for calculating the coordinates of said target in said grid system.

6. The system of claim 4 wherein each known location in said system is at a position identified by coordinates in a grid system, and said means for calculating said location comprises means for calculating said coordinates in terms of latitude and longitude.

7. The system of claim 4 wherein each known location in said system is at a position identified by coordinates in a grid system, and said means for calculating said location comprises means for calculating said coordinates in terms of polar coordinates centered upon one of said positions.

8. The system of claim 4 wherein there are a plurality of said repeater means and each of said repeater means comprises an antenna coupled to means for steering received pulses through a logic system to a transmitter and said antenna.

9. The system of claim 8 wherein said logic system comprises means for accepting pulses from said steering means only during very narrow time defined acceptance windows centered upon the system identifying repetition rate of said radio frequency pulses.

10. The system of claim 8 or claim 9 wherein said logic system comprises means for counting each of said radio frequency pulses, and means for selecting and retransmitting only those of the counted pulses which correspond to a predetermined count, the predetermined count being a prime number assigned to identify the repeater station where the counting occurs.

11. The system of claim 4 wherein said calculating means comprises means for measuring said time differential in terms of two periods, each of said periods beginning with a receipt at said target position of a radio frequency pulse transmitted by said pulse transmitter means at said recurring repetition rate, one of the two periods ending with the receipt of a selected one of said pulses retransmitted from one of said repeater stations, and the other of the two periods ending with the receipt of a selected one of said pulses retransmitted from the other of said repeater stations.

12. The system of claim 11 wherein said radio frequency pulse transmitter means comprises means for transmitting each of said pulses at a cyclically recurring interval which recurs at said system identifying repetition rate, said repetition rate defining a subframe, said station at said target position comprising means for picking up the same pulse receipt patterns after an occurrence of a predetermined number of subframes, said two selected pulses which end said two periods occurring in different subframes.

13. The system of claim 12 and means for generating very narrow time defined acceptance windows during which a pulse must be received by a station in order to be accepted as a valid station.

14. The system of claim 13 wherein each of said repeater stations comprising means for retransmitting pulses at intervals which are prime number multiples of said subframe repetition rate, each of said repeater stations being identified by a different prime number.

15. A method of locating a point in a coordinate system defining a geographical area, the method comprising the steps of:
 (a) transmitting first identifiable pulses of radio frequency from one point over a direct path to a second point in said coordinate system, the receipt of said first pulse starting at least one time period measurement;
 (b) transmitting second, different, and independently identifiable pulses from said one point over a second, different, independent, and longer path to said second point, the receipt of said second pulse stopping said time period measurement; and (c) calculating the location of said second point by calculations based upon comparisons of said time period measurements.

16. A method of locating a point in a coordinate system defining a geographical area, the method comprising the steps of:

(a) transmitting first identifiable pulses of radio frequency from one point over a direct path to a second point in said coordinate system, the receipt of said first pulse starting at least one time period measurement;

(b) transmitting second identifiable pulses from said one point over a second and longer path to said second point, the receipt of said second pulse stopping said time period measurement;

(c) calculating the location of said second point by calculations based upon comparisons of said time period measurements wherein said identifiable pulses are different multiples of the same time base; and (d) calculating said multiples to place all of said pulses on the same time base.

17. The method of claim 15 or claim 16 wherein there are at least two of said time period measurements and the added step of transmitting third identifiable pulses from said one point over a third path which is longer than said direct path and different from said second path, the receipt of said third of said pulses stopping a second of said time period measurements.

18. The method of claim 16 wherein the step of transmitting said first pulses over said direct path comprises transmitting said pulse with a pulser recurrence at a predetermined pulse repetition rate which define subframes and said second and third pulses do not occur in the same subframe.

19. The method of claim 18 wherein said steps of calculating comprise calculating said locations and said multiples using a programmable microprocessor.

20. A radar location system comprising at least three stations transmitting and receiving on a particular frequency, means at a first of said stations for transmitting a first and continuous stream of pulses formed by interrupting said frequency at a cyclically recurring station identifying rate for an indefinite period of time during which said system is operating, means at a second of said stations responsive to the receipt of a predetermined number of pulses in said first continuous and indefinite stream of pulses for thereafter repeating pulses in said first stream by pulses by interrupting said frequency at a rate which identifies the second station, thereby forming a second stream of pulses lagging after said first stream of pulses by a time period at least partially reflecting the distance between said first and said second stations, and means at a third of said stations responsive jointly to the receipt of said first and second stream of pulses recurring at the rate which identifies the first station for calculating the location of said third station.

21. A radar location system comprising at least three stations, means at a first of said stations for transmitting a first stream of pulses which recur at a station identifying rate, means at a second of said stations responsive to the receipt of a predetermined number of pulses in said first stream of pulses for thereafter repeating each pulse in said first stream of pulses, thereby forming a second stream of pulses lagging after said first stream of pulses by a time period at least partially reflecting the distance between said first and said second stations, means at a third of said stations responsive jointly to the receipt of said first and second stream of pulses for calculating the location of said third station, and means at said third station responsive to a receipt of less than said predetermined number of pulses in said first stream of pulses for generating cyclically recurring first window pulses coinciding with said first stream of pulses and ocurring at said station identifying rate, and means for rejecting any pulses which does not coincide with a corresponding one of said first window pulses.

22. The radar location system of either claim 20 or claim 21 and means responsive to a receipt of a predetermined number of pulses in said second stream of pulses for generating a cyclically recurring window coinciding with said second stream of pulses and occurring at said station identifying rate, and means for rejecting any pulse which does not coincide with a corresponding one of said second window pulses.

* * * * *